United States Patent Office 3,500,571
Patented Mar. 17, 1970

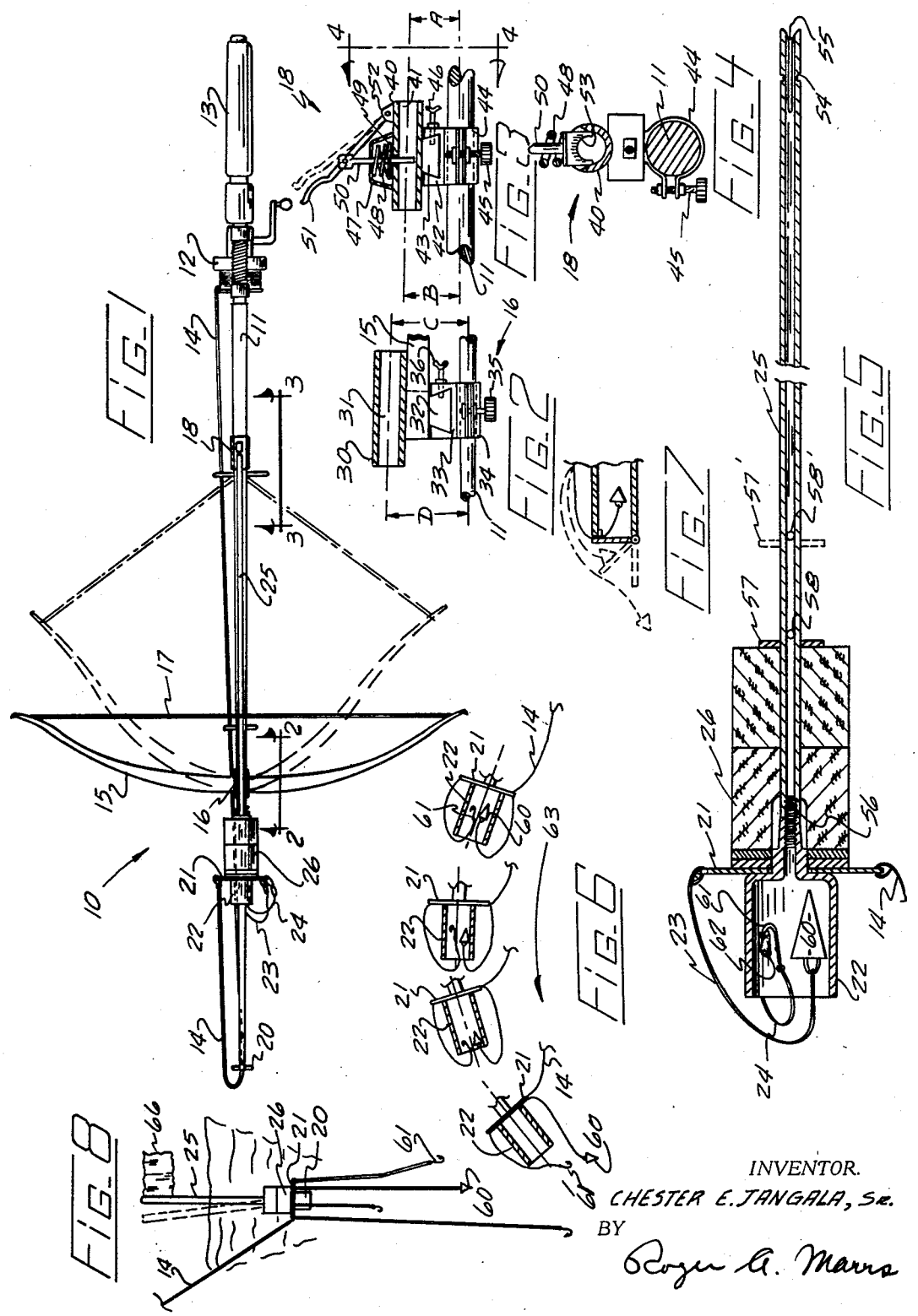

3,500,571
AUTOMATIC CASTING APPARATUS
Chester E. Jangala, Sr., Los Angeles, Calif.
(6134 Fair Ave., North Hollywood, Calif. 91602)
Filed June 4, 1968, Ser. No. 734,412
Int. Cl. A01k 91/02
U.S. Cl. 43—19        11 Claims

ABSTRACT OF THE DISCLOSURE

A fishing rod carries a bow mechanism adapted to launch a bait arrow. The arrow includes a bait cup secured to one end thereof and buoyancy means so that the arrow will float in the water. Attachment means are employed for detachably securing the bow mechanism on the rod and an arrow release mechanism is carried on the rod in spaced relationship to the bow mechanism for loosening the tensioned arrow to effect launching. Signalling means are carried by the arrow so that the position of the arrow can be located after launch.

BACKGROUND OF THE INVENTION

Field of the invention

The present invention relates to fish casting accessories for anglers and, more particularly, to a novel automatic casting apparatus incorporating means carried by a fishing rod for eliminating the heretofore swinging casting effort of the angler required in casting the baited end of the fishing line in a desired spot or location in a body of water.

Description of the prior art

It is the conventional practice of anglers to secure bait on the end of a hook carried by a fishing rod by means of an interconnecting line stored on a fishing reel. The angler generally swings the rod in an intended direction so that the baited hook will drop into a desired place in the body of water. Generally, the end of the line carrying the hook is weighted so that the line is paid out from the reel as the baited hook is cast through the air. Obviously, such a conventional casting procedure includes many disadvantages which stem from the fact that the cast hook may catch on branches, bushes or other anglers in the vicinity and that the size of the weight is limited so that the length or distance of cast is greatly restricted. This latter disadvantage is particularly acute in ocean or surf fishing since it is desirable to cast the baited hook several hundred feet away from the angler.

To avoid the problems encountered by conventional casting techniques, many attempts have been made to provide an automatic casting device having means for propelling the fishing line from the rod. Such prior devices are represented by the disclosures set forth in U.S. Letters Patent 3,292,296; 2,345,043; and 2,216,341. Although these prior devices are automatic in launching baited missiles and for propelling the line from the rod, these devices do not include means for locating the missile after it has been launched and fail to provide a detachable coupling means for securing the propelling apparatus or mechanism onto a conventional fishing rod and reel. Therefore, the devices of the prior art are not adapted to be used with existing fishing equipment owned by the angler and furthermore, makes the location and recovery of the missile after launch extremely difficult.

SUMMARY OF THE INVENTION

Accordingly, the present invention obviates the problems and difficulties encountered with conventional automatic casting devices by providing a bow mechanism adapted to be detachably connected onto an elongated fishing rod which carries a conventional spinning reel for storing a length of fishing line. Between the bow mechanism and the reel, there is provided a projectile or missile release mechanism which may be manually controlled by the angler so as to effect release of the missile after the apparatus has been aimed. The forward end of the missile, such as an arrow, for example, carries a bait cup in which a baited hook, a suitable weight and a length of leader line may be stored and retained during the preparation for missile launch and during the actual launching of the missile. One end of the stored fishing line is secured to the bait cup so that as the missile travels through the air, the fishing line is drawn from storage on the fishing reel. In this fashion, the missile, including the baited hook and weight, may be readily retrieved by reeling in the paid out fishing line in accordance with normal practice.

A feature of the present invention resides in providing the projectile or missile with buoyancy means whereby the missile will float at the exact location of fishing. This not only indicates to the angler where the baited hook is located but serves as a signalling means to the angler when the baited hook has a fish thereon.

Means are provided for retaining the baited hook and weight in the bait cup during flight of the missile as well as means for mounting a plurality of individual buoyancy units so as to increase or decrease the floating capability of the missile.

Therefore, it is among the primary objects of the present invention to provide a novel automatic casting apparatus for anglers which provides and enables the angler to troll or retrieve a hooked fish, baited hook or lure without entanglement or loss thereof.

It is another object of the present invention to provide a novel automatic casting apparatus including an archery bow or other arrow propelling device adapted to be carried on a conventional fishing rod that will enable the angler to propel baited hooks or lures to a greater distance and more accurate location than possible with the use of available conventional spinning reel and rod.

Still another object of the present invention is to provide a casting device adapted to increase the normal casting range for fishing purposes.

Still another object of the present invention is to provide a novel means for retaining or holding the bait, hooks, lure and weight on a missile during flight whereby the contents may be dispensed or freed at the termination of the flight so as to be deployed into the water intended to be fished.

Still a further object of the present invention is to provide a novel automatic casting apparatus having means for locating the launched projectile and including means for indicating to the angler that a fish has been caught.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a plan view of the automatic casting apparatus incorporating the present invention and illustrating the bow mechanism in position for launching the bait projectile in broken lines;

FIGURE 2 is an enlarged sectional view of means for attaching the bow mechanism to the fishing rod as taken in the direction of arrows 2—2 of FIGURE 1;

FIGURE 3 is an enlarged sectional view of the bait projectile release mechanism shown in FIGURE 1 as taken in the direction of arrows 3—3 thereof;

FIGURE 4 is a cross-sectional view of the release mechanism shown in FIGURE 3 as taken in the direction of arrows 4—4 thereof;

FIGURE 5 is an enlarged sectional view of the bait arrow employed in connection with the bow mechanism illustrated in FIGURE 1;

FIGURE 6 is a diagrammatic view of the bait cup portion of the bait projectile illustrating discharge of bait, weight and hooks therefrom after launching;

FIGURE 7 is a cross-sectional view of another embodiment of the present invention showing a magnetic closure for retaining the bait, weight and hooks within the bait cup; and FIGURE 8 is a view illustrating the bait arrow floating in a body of water and further provided with a signalling means for indicating location.

DESCRIPTION OF THE PREFERRED EMBODIMENTS

Referring to FIGURE 1, the automatic casting apparatus of the present invention is indicated in the direction of arrow 10 and includes a fishing rod 11 on which is mounted a fishing reel 12 of the spinning type immediately ahead of a handle 13. The reel 12 is employed for storing a quantity of fishing line 14.

The opposite end of the rod 11 from its end formed with handle 13 is employed to carry a bow mechanism 15 by means of a mounting apparatus 16. The bow mechanism includes a draw string 17 adapted to be pulled taut in a rearward direction as shown in broken lines to a position where it is held tensioned by a release mechanism 18.

The free end of the line 14 is trained through an eyelet 20 and is attached to a disc 21 forming a part of a bait cup 22. Lead and weight lines 23 and 24 are attached at one end to the disc 21 and are suitably connected to conventional hooks and weights which are stored in the interior of the bait cup 22. The bait cup 22 is carried on the extreme end of a projectile such as an arrow 25, which includes a mid-portion seated on the attachment means 16 and has an extreme terminating rear portion seated on the release mechanism 18. In this position, the bait cup is substantially forward of the mounting mechanism 16 and when the projectile is loosened, the length of the projectile from the mounting means to the release means will pass over or through the mounting means 16. Situated behind the bait cup 22, there is provided a buoyancy means 26 suitable for ensuring that the projectile will float after launch.

Referring now in detail to FIGURE 2, the mounting mechanism 16 includes a tubular sleeve 30 having an open-ended bore 31 through which the shaft of arrow 25 is seated preparatory for launch. Sleeve 30 is disposed on top of the midsection stock of bow 15 while the underside of bow 15 includes a key 32 adapted to mate with a tapered wall channel formed in a member 33 carried on the rod 11. A clamp plate 34 is employed to secure the member 33 onto the rod 11 by means of a pair of fasteners 35 operably coupling lateral flanges on opposite sides of the member 33 and clamp plate 34, respectively. By means of the key 32 and the corresponding channel formed in member 33, the bow mechanism may be readily removed when desired for storage or carrying purposes. A screw lock 36 is provided which releasably couples member 33 with key 32.

It is to be particularly noted that sleeve 30 is slightly tilted or canted such that the forward end is spaced from the rod by the distance shown by letter D and the rear end of the sleeve is closer to the rod as indicated by the letter C. Therefore, when the arrow is launched, its trajectory will be elevated as the arrow leaves the sleeve 30.

Referring now to FIGURE 3 in detail, it can be seen that the release mechanism 18 includes a sleeve 40 having an open-ended bore 41. The sleeve 40 is carried in a corresponding channel on a member 42 by a key 43 in the same fashion as the mounting means 16 is carried by means of the key 32 and member 33. Member 42 is carried on the rod 11 by a clamp means 44 having fasteners 45 located on opposite sides of the rod adapted to connect lateral flanges together extending from both the clamp 44 and member 42, respectively. Screw fastener 46 releasably connects the key 43 with member 42 so that the release mechanism may be selectively detached when desired for storage or carrying purposes.

The release mechanism 18 includes a housing 47 carried on top of the sleeve 40 which contains a captured compressed spring 48. Spring 48 is employed to bias a plunger 50, by means of disc 49, into the bore 41 so as to capture the end of arrow 25 and to prevent the arrow from inadvertently releasing. One end of plunger 50 is pivotally secured to a trigger 51 which has an end pivotally carried on a bracket 52. The opposite end of plunger 50 from its end pivotally connected to the trigger is provided with an arcuate portion 53, as shown in FIGURE 4, which is adapted to move up and down through a slot provided in the sidewall of sleeve 40. The arcuate member 53 is adapted to move in and out of engagement with an annular recess or slot 54 provided in the end of arrow 25. When the trigger 51 is depressed, the arcuate portion of the plunger 50 will engage with the slot 54 to retain the arrow. However, when the plunger is raised by the trigger which is shown in broken lines in FIGURE 3, the arrow is released and the tension of the bow string 17 will launch the arrow.

Referring now to FIGURE 5, the arrow 25 is shown as having an elongated slot 55 adapted to receive the bow string 17 therein. The slot 55 terminates substantially forward of the release notch 54 so that the bow string will not interfere with the launching of the arrow from the release mechanism 18. The opposite end of the arrow shaft, which is illustrated as being hollow, includes from its notched end an internal bore into which a threaded member 56 is coupled so as to attach the cup portion 22 therewith. Disposed about the arrow shaft immediately behind disc 21, there is provided buoyancy means 26 which may take the form of a pair of plastic floats having a central bore so as to be readily mountable on the shaft of the arrow. Preferably, the plastic floats may be composed of any suitable polystyrene material or the like. A stop disc 57 is carried on the shaft to secure the float means against the disc 21. For this purpose, the shaft is provided with a plurality of aligned apertures 58 through which a cotter pin may be disposed to retain the disc 57 in position. If it is desired to increase the buoyancy of the arrow, the disc 57 may be moved to the position shown in broken lines by the numeral 57' and the pin can be inserted through the aperture 58' to retain the floats on the arrow. It can be seen that the bait cup 22 is open-ended and stores a lure or weight 60 as well as a hook 61 carrying bait 62.

As shown in FIGURE 6 after the arrow has been launched by the bow mechanism in the direction of arrow 63, the bait will eventually expel through the opening of the bait cup 22. Once the hook and weight are free from the cup, they will drop into the water. However, line 14 is attached to disc 21 so that the arrow is connected to the reel 12 thereby.

In FIGURE 7, the bait cup 22 includes a magnetic closure means which employs a panel 64 of magnetic material that is pivotally carried at the opening of the bait cup and is maintained closed by means of a permanent magnet 65. During launch, the weight and baited hook will bear against the inside of panel 64 to the extent that the magnetic coupling between the magnet 65 and the door will break so that the door will pivot open as shown in broken lines. Once the door or panel has opened the interior of the bait cup, the weight and baited hook will fall from the bait cup and be deployed into the water.

In FIGURE 8, the arrow 25 is shown at the fishing site after launch so that the hooks 61 and weight 60 downwardly depend from the disc 21. Because of the buoyancy means 26, the arrow will float in an upright orientation so that the rearmost portion of the arrow shaft will be visible above the surface of the body of water. Therefore, this portion of the arrow is suitable for carrying a signalling means, such as a flag 66 which will indicate the exact location of the hooks and arrow. Preferably, this flag is colored red or carries a pattern so as to attract visual notice.

While particular embodiments of the present invention have been shown and described, it will be obvious to those skilled in the art that changes and modifications may be made without departing from this invention in its broader aspects, and, therefore, the aim is to cover all such changes and modifications as fall within the true spirit and scope of this invention.

What is claimed is:

1. In a fish bait casting apparatus including a rod carrying a spinning reel for storing a quantity of fish line, the combination which comprises:
   a bow having a bow string extended between its opposite ends;
   means for detachably mounting said bow on said rod and including guide means;
   release means detachably mounted on said rod at a location between said reel and said bow for tensioning said bow string and including guide means;
   a projectile having a bait cup carried on its forward end and slidably carried by said guide means on said mounting means and said release means in engagement with said bow string;
   said bait cup being connected to the free end of said fish line carried on said reel and having fishing hooks and weights depending therefrom by fishing leader line whereby said hooks and weights are stored in said bait cup during flight of said projectile; and
   said release means being operably connected to said projectile to selectively loosen said projectile for flight in response to release of said bow string.

2. The invention as defined in claim 1 wherein said projectile carries a signalling means to indicate location of said projectile at the end of flight.

3. The invention as defined in claim 1 wherein said bait cup has an opening to allow expulsion of said hooks and weights after said projectile strikes the body of water.

4. The invention as defined in claim 4 wherein said bait cup includes a releasable closure member pivotally carried thereon adjacent said opening to confine said hooks and weights within said cup during flight of said projectile and to open said opening under applied weight load of said hooks and weights to effect expulsion thereof.

5. The invention as defined in claim 4 including magnetic means cooperatively carried on said cup and member selectively retaining said member over said closure opening for each casting occurrence thereof.

6. The invention as defined in claim 1 wherein said projectile includes buoyancy means carried behind said bait cup to float said projectile in an upright position.

7. The invention as defined in claim 6 including a disc carried on said projectile disposed between said cup and said buoyancy means releasably securing the free end of fishing line stored on said reel.

8. The invention as defined in claim 6 wherein
   said buoyancy means comprises at least one cylindrical body composed of a buoyant plastic-like material; and
   means for releasably securing said body onto said projectile.

9. The invention as defined in claim 6 wherein
   said projectile comprises an elongated arrow having a central bore extending through its shaft and having a nock formed in one end thereof to receive said bow string; and
   means carried on its opposite end for coupling with said cup.

10. The invention as defined in claim 9 including
    a first sleeve carried on said mounting means and constituting said guide means to support said arrow shaft immediately behind said buoyancy means; and
    a second sleeve carried on said release means and constituting said guide means to support arrow shaft at the location of said nock.

11. The invention as defined in claim 10 wherein said first and said second sleeves are co-axially disposed with respect to each other and are angularly disposed with respect to the major length of said rod so as to elevate the trajectory of arrow flight when said arrow is loosened.

References Cited

UNITED STATES PATENTS

| | | | |
|---|---|---|---|
| 3,059,370 | 10/1962 | Moore | 43—19 |
| 3,084,467 | 4/1963 | Bromwell | 43—41.2 X |
| 3,129,525 | 4/1964 | Lewis | 43—19 |
| 3,314,186 | 4/1967 | Viveiros | 43—19 X |
| 3,355,836 | 12/1967 | Hanson | 43—19 |

WARNER H. CAMP, Primary Examiner